(No Model.)
W. A. ROSENBAUM.
ELECTRODE FOR SECONDARY BATTERIES.
No. 460,599. Patented Oct. 6, 1891.
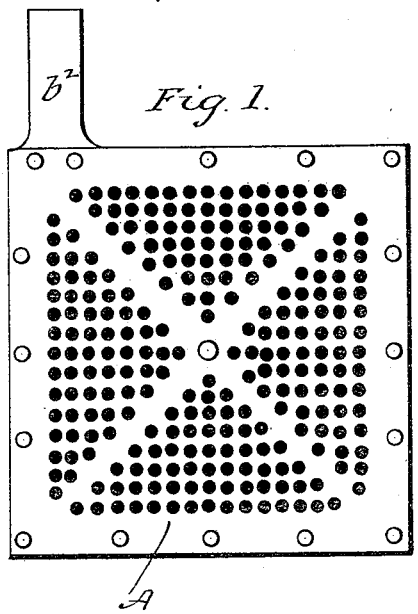
Fig. 1.
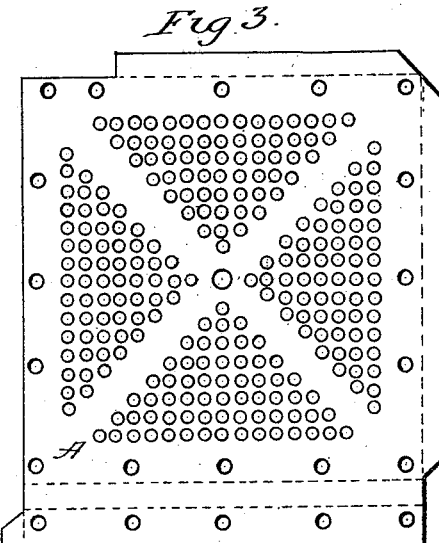
Fig. 3.
Fig. 2.
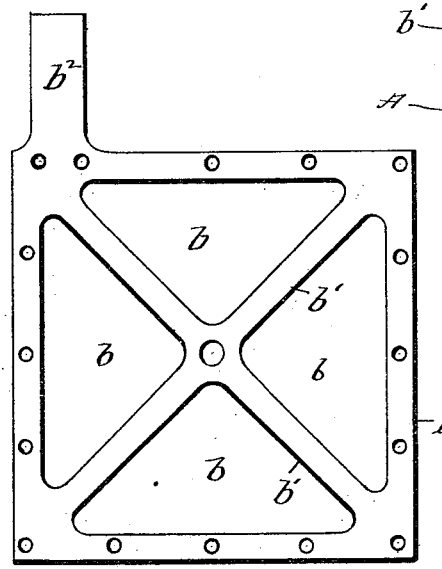
Fig. 4.
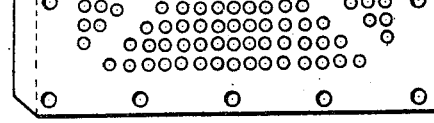
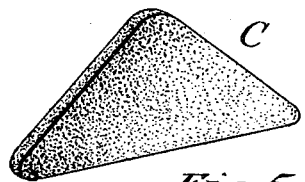
Fig. 5.
WITNESSES:
Frank S. Ober
Edward A. Wagner
INVENTOR
William A. Rosenbaum
BY
Johnston
ATTORNEY.

UNITED STATES PATENT OFFICE.

WILLIAM A. ROSENBAUM, OF JERSEY CITY, NEW JERSEY.

ELECTRODE FOR SECONDARY BATTERIES.

SPECIFICATION forming part of Letters Patent No. 460,599, dated October 6, 1891.

Application filed December 31, 1890. Serial No. 376,365. (No model.)

*To all whom it may concern:*

Be it known that I, WILLIAM A. ROSENBAUM, a citizen of the United States, residing in Jersey City, county of Hudson, and State of New Jersey, have invented certain new and useful Improvements in Secondary or Storage Electric Batteries, of which the following is a specification.

My invention relates to secondary or storage electric batteries, the object being to provide a battery which shall be cheap of manufacture, of light weight, durable, and efficient.

The invention has particular reference to the construction of the plates or electrodes; and consists of an envelope in combination with a separate frame inclosed within the same and tablets of active material held in place by the frame and the envelope.

The details of the invention will now be described, with reference to the accompanying drawings, in which—

Figure 1 represents a side elevation of the complete plate. Fig. 2 is a vertical central section of the same. Fig. 3 is a plan of the envelope before it is folded. Fig. 4 is a side view of the frame; and Fig. 5 is a view of one of the tablets of active material.

Referring to the drawings by letter, A represents an envelope consisting of a single sheet of lead of the form shown in Fig. 3. It is folded along the dotted lines at the middle.

B represents a frame of lead provided with four triangular openings $b$ $b$ $b$ $b$, which form two diagonal ribs $b'$ $b'$, crossing each other at the center. The frame is also provided integrally with a projecting lug $b^2$, located near one of the upper corners, which serves as a means for electrical connection.

C represents a tablet of active material. It is formed by molding and compressing the oxide, and is made in the shape of a triangular sheet about three-sixteenths of an inch thick. The size is such as to fit loosely in the triangular openings in the frame B.

The envelope is provided in each half with four groups of perforations, which, when the plate is complete, stand opposite the tablets of active material. It is also provided with two perforations, one at the center of each half, and with perforations around the edge, which, when the plate is folded as hereinafter described, register with similar openings around the edges and in the center of frame B. In assembling the parts to make a complete plate the frame is placed against one-half of the open envelope, and four tablets of the active material inserted in the respective openings of the frame. The other half of the envelope is then folded up against and incloses the frame and active material. The rivets around the edges and in the middle are then secured in place, the edges soldered over, and the plate is ready for mounting.

The openings in the frame for the active material are a little larger than the tablets, so that longitudinal expansion of the tablets may take place to a limited extent without injury to the plate.

The frame is made preferably by casting, and the body of the frame and the connecting-lug are of the same thickness.

The peculiar advantages of this plate are, first, that the active material being divided into four or more tablets, and each tablet independent of the other, any buckling which may take place in the individual tablets will not extend over the whole plate, and while it may cause inequalities in the four parts of the plate they will not be so great as to be detrimental to the working of the battery; second, the active material is applied in the simplest and easiest manner and all the parts of the battery may be quickly assembled, and third, inasmuch as the frame, which extends across the plate in several directions, is integral with the connecting-lug, this portion of the circuit will always be complete and of low resistance.

Having now described my invention, what I claim is—

1. A secondary-battery electrode consisting of the combination of an envelope, a separate metallic frame within the same, and tablets of active material held in said frame, substantially as described.

2. A secondary-battery electrode consisting of the combination of an envelope, a metallic frame inclosed thereby, and tablets of active material, each tablet supported on its faces by the opposite side of the envelope and on its edges by the frame.

3. A secondary-battery electrode consisting of the combination of an envelope, a metallic frame within the same, the frame dividing the space within the envelope into a plurality of spaces, and tablets of active material occupying the respective spaces in the frame, each tablet being smaller than the space which it occupies.

4. A secondary-battery electrode containing a plurality of spaces or chambers for the active material, the walls of which are perforated, in combination with tablets of active material located in said spaces, but being smaller than the said spaces.

In witness whereof I have hereunto signed my name in the presence of two subscribing witnesses.

WILLIAM A. ROSENBAUM.

Witnesses:
FRANK S. OBER,
EDWARD A. WAGNER.